United States Patent [19]
Lee et al.

[11] Patent Number: 5,689,816
[45] Date of Patent: Nov. 18, 1997

[54] METHOD AND APPARATUS FOR DIFFERENTIATING A WIRELESS ANALOG SIGNAL FROM A WIRELESS DIGITALLY ENCODED SIGNAL

[75] Inventors: Tony Siuman Lee, Alameda; Jong-keung Cheng, Danville, both of Calif.

[73] Assignee: Atmel Corporation, San Jose, Calif.

[21] Appl. No.: 556,748

[22] Filed: Nov. 2, 1995

[51] Int. Cl.$^6$ .............. H04B 1/40; H04L 25/00; H04L 27/00

[52] U.S. Cl. .............. 455/74; 455/142; 455/226.1; 375/216

[58] Field of Search .............. 375/216, 217, 375/316, 317; 455/33.1, 33.2, 54.1, 54.2, 67.1, 142, 226.1, 226.2, 89, 144, 143, 205, 227–229, 74; 379/59, 58

[56] References Cited

U.S. PATENT DOCUMENTS

| | | |
|---|---|---|
| 5,400,368 | 3/1995 | Cheng et al. . |
| 5,418,815 | 5/1995 | Ishikawa et al. .......... 375/216 |
| 5,436,942 | 7/1995 | Cheng et al. . |
| 5,438,595 | 8/1995 | Cheng et al. . |
| 5,491,726 | 2/1996 | Cheng et al. . |
| 5,598,430 | 1/1997 | Hachisuka et al. .......... 375/216 |

*Primary Examiner*—Nguyen T. Vo

[57] ABSTRACT

In accordance with IS-136 standard, an analog wireless signal and a digitally encoded wireless signal can be received by a remote telecommunicating device. The remote device can differentiate between the analog wireless signal and the digitally encoded wireless signal by measuring the average energy of the signal in the portion of the baseband signal that is expected to contain the Supervisory Audio Tone signal, and the portion of the baseband signal that is expected to be outside of the audio band for an analog signal. The average energy of the portion outside of the audio band is subtracted from the average energy of the SAT signal. The difference is compared to a threshold, and based upon the comparison, the characteristic of the received wireless signal, i.e. analog or digital, is determined.

19 Claims, 4 Drawing Sheets

METHOD AND APPARATUS FOR DIFFERENTIATING A WIRELESS ANALOG SIGNAL FROM A WIRELESS DIGITALLY ENCODED SIGNAL

TECHNICAL FIELD

The present invention relates to a mobile telecommunicating device which can communicate wirelessly with a base station transmitting a wireless signal, which can be either an analog signal or a digitally encoded signal. The mobile telecommunicating device can differentiate rapidly the wireless signal received between the analog signal or the digitally encoded signal.

BACKGROUND OF THE INVENTION

Wireless communication is well known in the art. Heretofore, one type of wireless communication is known as a "cellular" communication wherein each stationary unit receives and transmits signals to mobile units within its allocated geographical region, called a cell. As mobile units move from one cell to another, communication is transferred from one stationary unit in one cell to another stationary unit in another cell.

Heretofore, cellular communication is analog based and has risen in popularity. However, as a result, the airways have become increasingly crowded and the capacity of the communication system to take on new subscribers is becoming increasingly of a problem. Digital cellular communication offers an opportunity to increase the number of subscribers to operate within the cellular system. However, to bridge the gap between the current analog cellular system and the digital cellular system, a standard has been proposed. The standard proposed by EIA/TIA (Electronic Industry Association/Telecommunications Industry Association), known as the IS-136 standard, specifies that communication between a mobile unit and a base unit should be capable of operating in both the analog and the digital mode.

The IS-136 standard specifies that when operating in the digital wireless communication mode, communication between a base unit and a mobile unit occur in a Time Division Multiplex Access (TDMA) mode. In a TDMA mode, the digitally encoded signal is transmitted in a plurality of non-contiguous time slots. Communication between a base unit and a mobile unit occurs in an assigned time slot, within each frame. In each time slot, of approximately 6.7 msec in duration, digitally encoded synchronization signal must first be transmitted followed by the digitally encoded data signal. Furthermore, within the digitally encoded data signal, at a predetermined time period, a digitally encoded marker signal is transmitted. These are all well known standards in the IS-136 specification.

Furthermore, a channel carrying a digitally encoded signal can carry either digitally encoded voice signals or control signals for all the digital channels. This latter is the so-called Digital Control Channel, or DCC. From a digitally encoded channel carrying voice signal, one can determine the location of the DCC. The rest of the channels would be carrying wireless analog signals.

One of the problems of communication in the IS-136 standard is that upon power up, the remote telecommunication device must "hunt" to differentiate between channels that carry digitally encoded wireless signals and analog wireless signals, with the ultimate aim, of course, to locate the DCC channel.

Heretofore, the prior art suggests analyzing the characteristics of each channel to determine the type of signal carried by that channel. In particular, one method teaches analyzing the channel to determine the existence of the DVCC marker signal which is present in all digitally encoded signals. However, since each digital channel is approximately 20 msec in duration, the analysis of each channel, would require multiples of 20 millisecs.

It is one aim of the present invention to minimize the time required to search for a Digital Control Channel in a wireless communication scheme wherein digitally encoded signals and analog signals are both transmitted.

Although the present invention, in the preferred embodiment, discloses a wireless communication systems using the IS-136 standard capable of operating in both analog and digital mode, it should be apparent that the invention, as set forth herein, can be used in any wireless, communication system, wherein both digitally encoded signals and analog signals are transmitted.

SUMMARY OF THE INVENTION

In the present invention a mobile telecommunicating device can communicate wirelessly with a base station, wherein the base station transmits a wireless digitally encoded signal in a plurality of first channels, a control signal for the wireless digitally encoded signal in a second of the plurality of channels, and a wireless analog signal in a third of the plurality of channels. The apparatus can differentiate between the wireless digitally encoded signal from the wireless analog signal. The apparatus comprises an antenna means for receiving a wireless signal transmitted by the base station in one of the plurality of channels, and generates a received RF signal in response thereto. A baseband converting means converts the received RF signals into a baseband signal. A digitizing means digitizes the baseband signal into a digitized signal. A first filter means filters the digitized signal to produce a first filtered signal. A second filter means filters the digitized signal to produce a second filtered signal. A first generating means generates a first energy signal based upon the first filtered signal. A second generating means generates a second energy signal based upon the second filtered signal. A subtracting means subtracts the second energy from the first energy signal and produces a difference signal. A comparison means compares the difference signal to a threshold and in response thereto determines whether the wireless signal received is either a wireless digitally encoded signal or is a wireless analog signal.

The present invention is also a method of differentiating a wireless analog signal from a wireless digitally encoded signal.

DETAILED DESCRIPTION OF THE DRAWINGS

Figure 1:
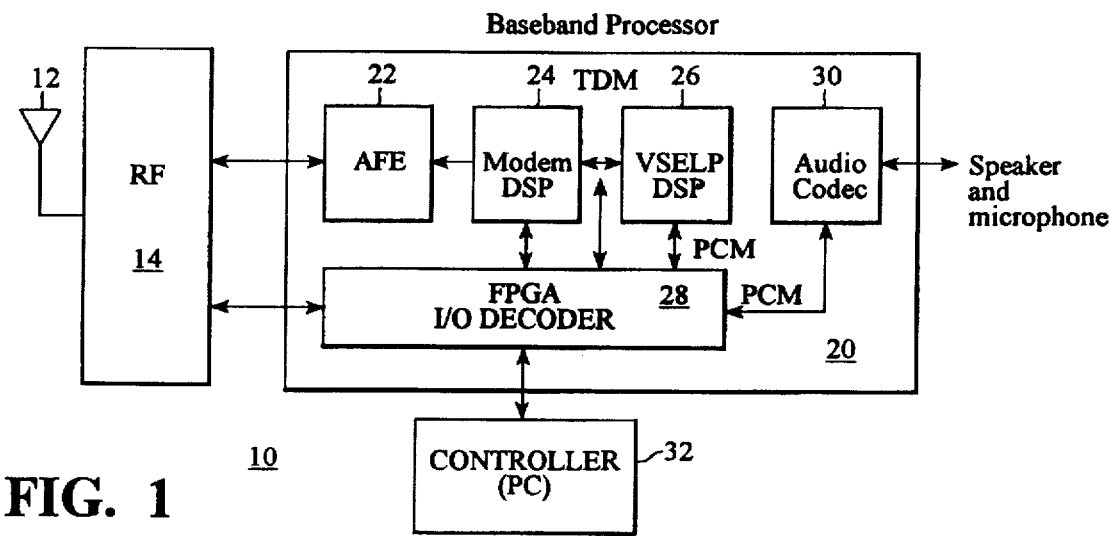
FIG. 1 is a block level diagram of a remote wireless communication unit of the present invention.

Referring to FIG. 1 there is shown a schematic block level diagram of a communication unit 10. In a wireless communication system between a mobile unit and a stationary unit, the communication unit 10 is that of the mobile unit. In addition, the schematic block level diagram shown in FIG. 1 represents a portion of the stationary unit. More particularly, as will be appreciated by those having ordinary skilled in the art, the stationary unit would comprise additional units to accomplish function such as hand off and the ability to process many remote units at the same time.

The communication unit 10 comprises an antenna 12 which receives the RF (radio frequency) wireless signal. The RF signal is then processed by an RF processing unit 14. From the RF processing unit the signal is then passed to a base band processor 20. The base band processor 20 comprises in AFE (analog front end) 22, which receives the RF signal from the RF processing unit 14. The signal from the AFE unit 22 is then received by a Modem DSP 24. The signal from the Modem DSP 24 is received by a VSELP DSP 26. A FPGA (Field Programmable Gate Array) 28 communicates with the Modem DSP 24 and the VSELP DSP 26. The FPGA 28 also communicates with an audio codec 30. In addition, the FPGA 28 is connected to a controller 32. Finally, the audio codec 30 is connected to a conventional speaker and microphone.

As previously discussed, the communication unit 10 in the preferred embodiment implements the IS-136 standard. Thus, the communication unit 10 can process both analog wireless signals as well as digitally encoded wireless signals. In general, the above-identified components operate in the following manner:

RF processing unit 14 receives the analog or the digitally encoded RF signal and converts them into an baseband signal for further processing by the based band processor 20. When operating in the digital mode, the RF processing unit 14 also demodulates the received IF signal to produce the analog I,Q signals.

The AFE unit 22 implements analog to digital and digital to analog conversions with associated filtering functions for the I/Q signals. In addition, it provides for four (one not used) channel D/A for RF control. It also has one A/D for RSSI (Receive Signal Strength Indicator) measurement.

The Modem DSP 24 in the preferred embodiment is a digital signal processor which is ROM coded (TMS 320c51) which implements analog mode processing, modem functions in the digital mode, as well as FACCH (Fast Access Control Channel)/SACCH (Slow Access Control Channel) error control functions. FACCH/SACCH are defined by the IS-136 standard and is well known in the art. The modem processor 24 interfaces with the FPGA I/O decoder 28 through its serial port. Through the FPGA 28, the FPGA 28 then communicates with the controller 32. The Modem DSP 24 also maintains the time division multiplex (TDM) bus for communication with the VSELP DSP processor 26 and the audio codec 30 when operating in the analog mode. The Modem DSP 24 communicates with the RF processor 14 through the AFE 22.

The VSELP DSP 26 is also a ROM coded DSP (TMS 320c51) which implements the VSELP codec functions, which is a speech compression algorithm. In addition, it performs error control functions associated with the speech frame and echo cancellation. Finally, it communicates with the Modem DSP 24 via the TDM port and is powered down during the analog mode operation.

The audio codec 30 implements the speech A to D and D to A conversion and associated filtering. It interfaces directly to the speaker and to the microphone (not shown). The speech samples are exchanged with the Modem DSP 24 through the TDM port and TDM to pulse code modulation (PCM) conversion circuit in the FPGA I/O decoder 28 during the analog mode operation. In addition, during the digital mode operation, the audio codec 30 interfaces with the VSELP DSP 26 through the PCM bus.

The FPGA I/O decoder 28 consist of a first FPGA1 28a, a second FPGA2 28d, and a PAL (Programmable Array Logic—not shown), for I/O address decoding. The first FPGA1 28a includes timing generation circuitry, wideband data demodulator, sync control interface, and baseband test interface. The second FPGA2 28b includes an interface (UPIF) to interface with the controller 32. In addition, it communicates with the audio codec 30 and the VSELP DSP 26 through the PCM port and has TDM/PCM conversion circuitry. Finally, the second FPGA2 28b has a sampling clock (interrupt control).

Figure 2:
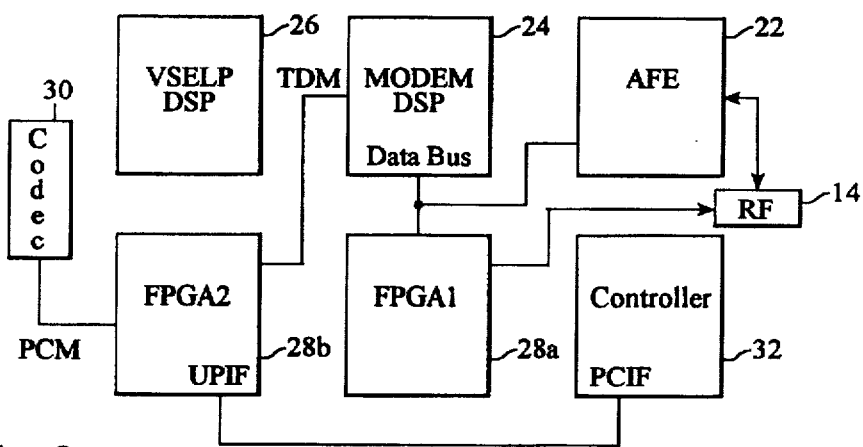
FIG. 2 is a block level diagram of the signal flow path when the wireless communication unit shown in FIG. 1 is operating in the analog mode.

Referring to FIG. 2, there is shown the signal flow for the communication unit 10 when operating in the analog mode. As can be seen, when operating in the analog mode, the VSELP DSP 26 is completely "turned off". The analog wireless signal is received by the RF unit 14 and is supplied to the AFE unit 22. From the AFE unit 22, the signal is supplied to the Modem DSP 24. The Modem DSP 24 through its TDM port communicates with the second FPGA2 28b. From the PCM port of the second FPGA2 28b, the second FPGA2 28b communicates with the codec 30.

Figure 3:
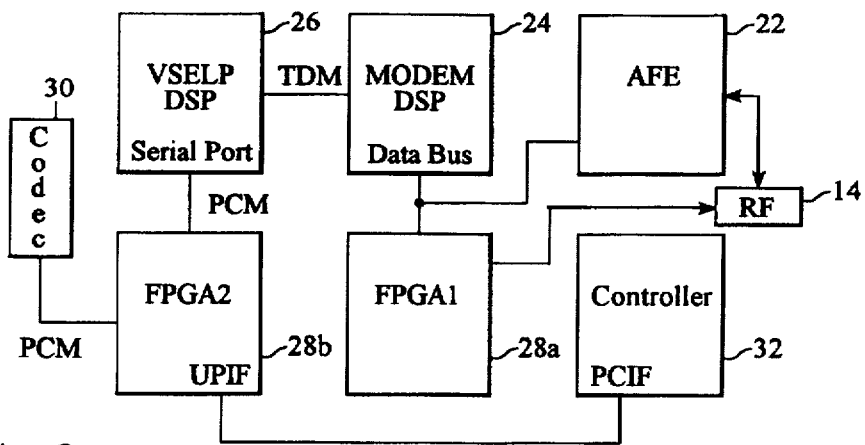
FIG. 3 is a block level diagram of the signal flow path when the wireless communication unit shown in FIG. 1 is operating in a digital mode.

Referring to FIG. 3, there is shown a block level diagram of the signal flow when the communication unit 10 operates in the digital mode. In this mode, the VSELP DSP 26 is actively involved in the processing of the received digitally encoded signal.

Figure 6:
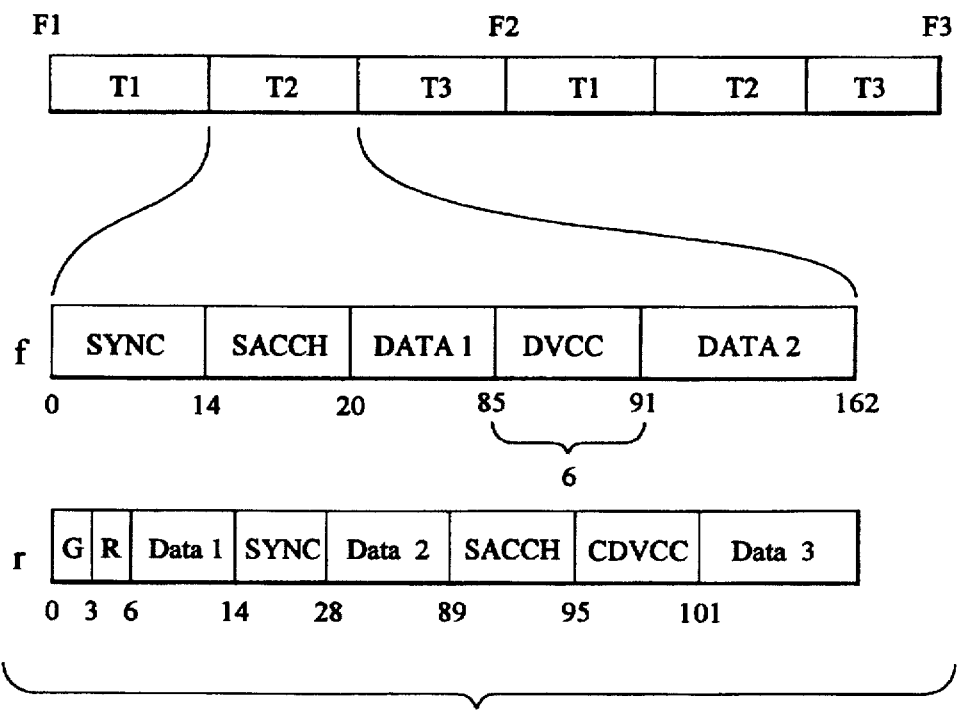
FIG. 6 is a timing diagram of the protocol of communication between like units of FIG. 1, when operating in a digital mode.

Referring to FIG. 6, there is shown a timing diagram of a digitally encoded signal when the communication unit 10 operates in the digital mode, implementing in particular, the IS-136 standard. The communication between a base unit and a mobile unit is divided into a plurality of frames, designated as F1, F2, etc., with each frame lasting 20 msec. In the digital mode of operation, each 20 msec. frame is further divided into a plurality of time slots, shown as T1, T2 and T3. Using the capability of voice compression as performed by VSELP processor 26, at full rate, 8 kbits/sec., for the same frame at the same frequency, in the digital mode, the base unit can serve to communicate with three different mobile units. Further, when the VSELP DSP 26 is operating at half rate compression i.e., 4 kbits per second, communication between the base unit and a plurality of mobile units can occur using a 40 msec. frame with each frame divided into six different time slots or serving six users.

Each time slot Tn can accommodate the transmission of 162 symbols or 324 bits. The base unit and the mobile unit communicate over separate frequency channels thereby accomplishing full duplex transmission. The protocol of transmission from the base unit to the mobile unit is shown and designated as f (for forward). The protocol of transmission from the mobile unit to the base unit is shown and is designated as r (for reverse). In the forward protocol, the IS-136 standard dictates that the digitally encoded signal begins with 14 symbols of synchronization signal followed by 148 symbols of data signal, with 6 symbols of DVCC (a marker signal) located in the middle of the data field between symbols 85–91. Thus, within each forward time slot, transmission of 162 symbols include sync and data.

Figure 4:
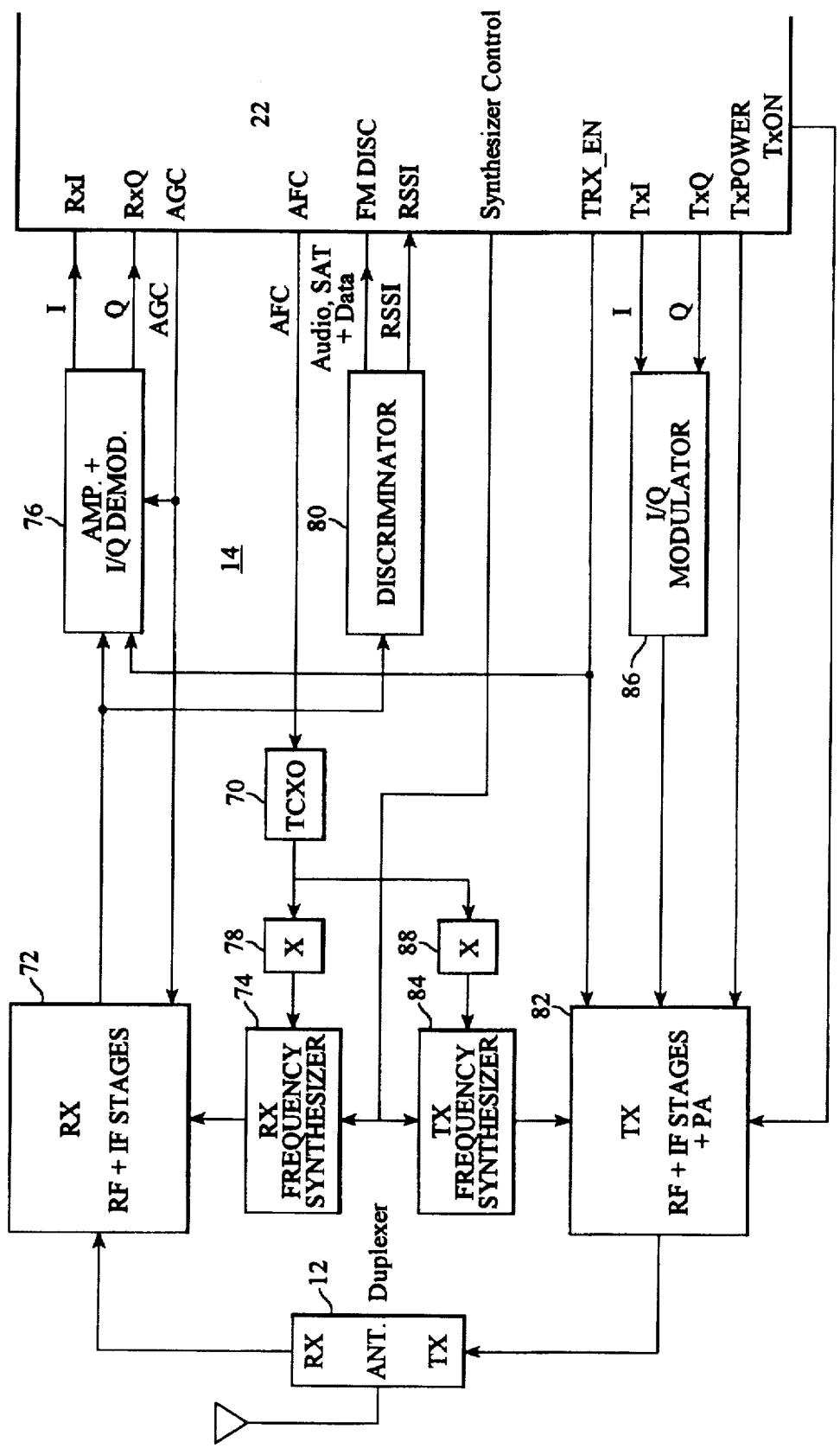
FIG. 4 is a detailed block level diagram of one of the RF unit portion of the communication unit shown in FIG. 1.

Referring to FIG. 4, there is shown a detailed block level diagram of the RF processing unit 14. The RF processing unit 14 receives the signal from the antenna 12 through a duplexer. The received signal is supplied to an RF+IF stage 72. The RF+IF stage 72, as is well known in the art, has an RF filter, low noise amplifier which serves to filter and amplify the received signal, and an RF to IF converter to convert the received RF signal into an intermediate frequency signal. The conversion is based upon a difference frequency signal generated by an RX frequency synthesizer 74. The frequency selected by the RX frequency synthesizer 74 is based upon a signal supplied from a temperature compensated crystal oscillator 70, passing through an appropriate multiplier 78.

The output of the RF+IF stage 72 is then supplied to an amp and I/Q demodulator 76 whose gained is selected by an automatic gain control signal AGC. The outputs of the amp+I/Q demodulator 76 are the analog I and analog Q signals.

In the transmit mode, the RF processing unit 14 comprises similar components as the above. The analog I and analog Q signals are supplied to an I/Q modulator 86, which modulates the analog I,Q signals on an IF carrier signal. The output of the I/Q modulator 86 is then supplied to an RF+IF stage 82. The RF+IF stage 82 converts up the output of the I/Q modulator 86 into an RF signal for transmission by the antenna 12. The frequency to convert from the intermediate frequency to the RF frequency is controlled by the TX frequency synthesizer 84. The TX frequency synthesizer 84 also receives the output of the temperature compensated crystal oscillator 70 multiplied by an appropriate multiplier 88.

Figure 5:
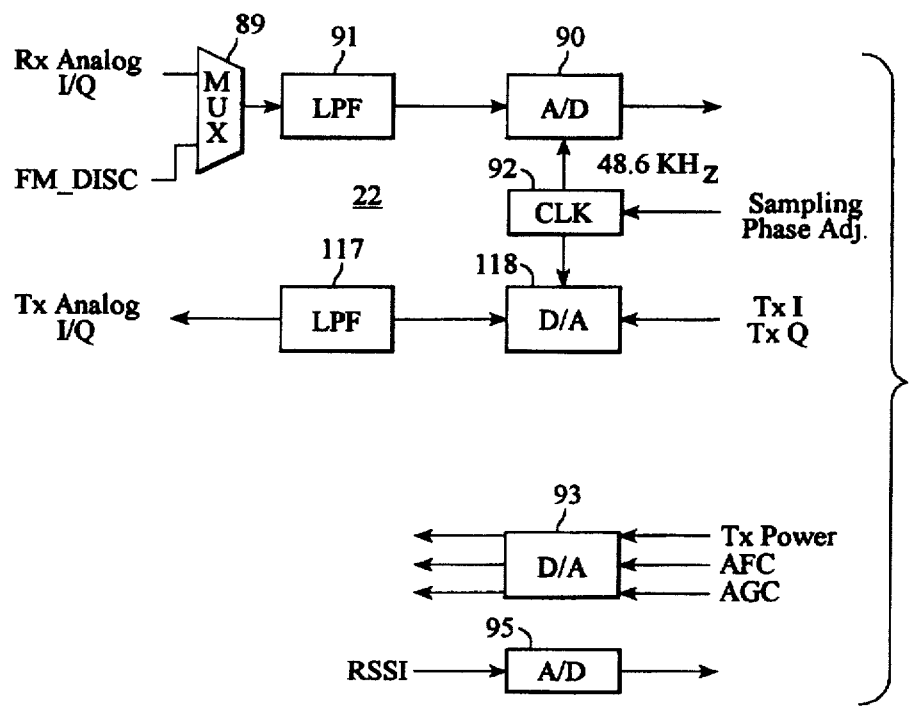
FIG. 5 is a detailed block level diagram of the Analog Front End portion of the communication unit shown in FIG. 1.

Referring to FIG. 5, there is shown a detailed block level diagram of the AFE unit 22. The AFE unit 22 comprises a multiplexer 89 which receives at its inputs the Rx Analog I/Q signal and the FM_Disc signal. In the operation of the method of the present invention, the multiplexer 89 is set such that the signal FM_Disc is passed therethrough. If a digitally encoded signal is found, then the operation of the multiplexer 89 would be switched such that the signal RX Analog I/Q would be passed through.

From the multiplexer 89 the FM_Disc signal is supplied to a Low Pass Filter 91. The signal output of the LPF 91 is then supplied to an A/D converter 90. The A/D converter 90 is operated at a frequency of 48.6 KHz supplied by a clock signal from the clock 92. The clock 92 can be adjusted by a sampling phase adjustment signal. If a digitally encoded signal channel is found, then the output of the A/D converter 90 would produce the digital RxI and the digital RxQ signals.

The AFE unit 22 also comprises a D-to-A converter 118. The D-to-A converter 118 receives the transmit digital I and Q (Tx I/Q) signals and converts them into analog Tx I/Q signals. The D-to-A converter 118 also receives the clock signal from the clock 92. The analog Tx I/Q signals are then supplied to a second LPF 117. The output of the second LPF 117 is then supplied as the Tx analog I/Q signals and are provided to the RF unit 14.

The AFE unit 22 also comprises a D-to-A converter 93 which receives the control signals of Tx_Power, AFC, and AGC. These digital signals are converted into an analog signal and are supplied to the RF unit 14 to control the RF unit 14. Finally, the AFE unit 22 receives the RSSI (receive signal strength indicator) signal and digitizes it by the A-to-D converter 95.

Figure 7:
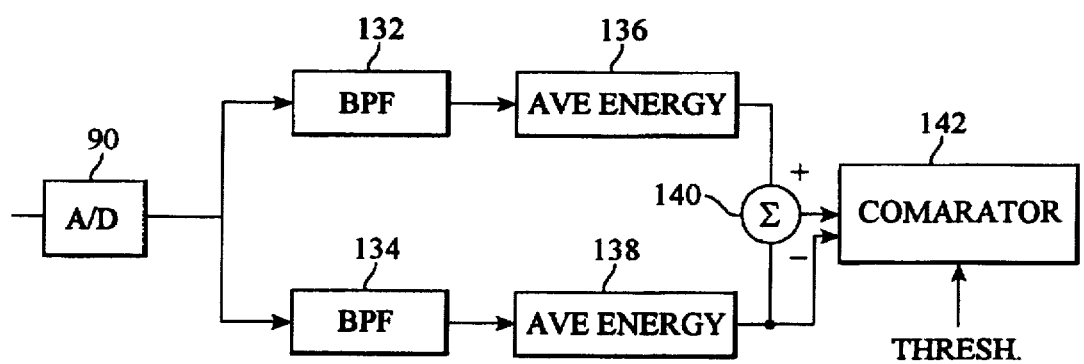
FIG. 7 is a block level diagram of the portion of the communication unit shown in FIG. 1 for carrying out the present invention.

Referring to FIG. 7, there is shown a block diagram of the portion of the communication unit 10 which receives the signal from the A/D converter 90 and carries out the present invention. The signal from the A/D converter 90 is supplied to two Band Pass Filters 132 and 134 simultaneously. The first Band Pass Filter 132 has a center frequency of 6 Khz with a bandwidth of approximately 250 Hz. The second Band Pass Filter 134 has a center frequency of 11 Khz with a bandwidth of approximately 250 Hz.

The output of the first BPF 132 is a first filtered signal which is supplied to a first average energy determinator 136. The output of the second BPF 134 is a second filtered signal which is supplied to a second average energy determinator 138. Each of the first and second average energy determinator 136 and 138 is the same. The first average energy determinator 135 receives the first filtered signal from the first BPF 132, and determines the amplitude of the first filtered signal, over a period of time. The sum of the amplitude of all the first filtered signals received over the period of time, divided by the period of time produces the average energy signal from the first average energy determinator 136.

Over the same period of time, the second average energy determinator 138 sums the amplitude of the second filtered signals from the second BPF 134 and divides the result by the same period of time to produce the second average energy signal.

The first and second average signals are supplied to a subtractor 140, which subtracts the first energy signal from the second energy signal and produces a difference signal. The difference signal is supplied to a comparator 142. The comparator 142 also receives three threshold values, and based upon the following comparison determines if the wireless signal received is either an analog signal or is a digitally encoded digital signal. The wireless signal received is determined to be a wireless analog signal if:

a) first energy signal from first average energy determinator 136—second energy signal from second average energy determinator 138>threshold 1; or b) i) first energy signal from first average energy determinator 136—second energy signal from second average energy determinator 138>threshold 2 (threshold 2<threshold 1), and ii) second energy signal from second average energy determinator<threshold 3.

Otherwise, the wireless signal is assumed to be a digitally encoded signal, such as a digital voice signal or a digital signal from the DCC channel.

The selection of threshold 1, threshold 2, and threshold 3, and the theory of operation of the present invention is as follows. If the wireless signal received at the antenna 12 is an analog voice signal, the analog channel would also include the Supervisory Audio Tone (SAT) signal, in accordance with the IS-136 standard. The Discriminator 80 would convert the received wireless signal to a baseband SAT signal. If the analog FM_Disc signal is passed through the second Band Pass Filter 132 with its center frequency of 11 KHz with a bandwidth of approximately 250 Hz, there would be no appreciable signal after passing through the second BPF 132. On the other hand, if the wireless signal received is a digitally encoded signal, passing the received signal through the Discriminator 80 would spread out the signal, thereby generating a signal even after passing through the second BPF 132. Thus, the choice for the first Band Pass Filter 132 is that it is centered about the expected baseband frequency for the Supervisory Audio Tone (SAT). The choice for the second Band Pass Filter 134 is that it is centered about the baseband frequency which is outside of the audio band for the SAT signal.

Threshold 1 is a threshold for the difference energy signal that is normally expected if the received wireless signal is an analog signal. If the received wireless signal is analog, then the first energy signal would be high (representing the detection of the SAT signal), while the second energy signal is low (representing little or no energy signal from outside of the analog audio band). Thus, the difference signal would be high. If the difference energy signal is higher than threshold 1, then the received wireless signal is an analog signal.

Threshold 2 is a threshold for the difference energy signal that is less than threshold 1. In that event, either the SAT signal is weak, or the energy signal from outside of the audio band is high, or a combination of both. However, even if the difference energy signal is weaker than threshold 1 (but still greater than threshold 2), the wireless signal received is still determined to be an analog signal if the contribution from outside of the audio band is less than threshold 3. In other words, although the difference energy signal is weak, the signal outside of the audio band is so weak (less than threshold 3), that the received signal must be a wireless analog signal.

As can be seen from the foregoing, with a simple comparison, the method and apparatus of the present invention can quickly differentiate the received wireless signal between a wireless analog signal and a wireless digitally encoded signal.

What is claimed is:

1. A method of determining a characteristic of a wireless signal transmitted in one of a plurality of channels, wherein said characteristic of said wireless signal is either a digitally encoded signal or an analog signal, said method comprising:
   receiving said wireless signal to produce an RF received signal;
   converting said received RF signal into a baseband signal;
   digitizing said baseband signal to produce a digitized signal;
   filtering said digitized signal by a first filter means to produce a first filtered signal;
   filtering said digitized signal by a second filter means to produce a second filtered signal;
   generating a first energy signal based upon said first filtered signal;
   generating a second energy signal based upon said second filtered signal;
   comparing said first energy signal to said second energy signal; and
   determining the characteristic of said wireless signal based upon said comparison.

2. The method of claim 1 wherein said comparing step further comprises:
   subtracting said first energy signal by said second energy signal to produce a difference energy signal; and
   comparing said difference energy signal to a threshold.

3. The method of claim 2 wherein said first filter means is a bandpass filter having a center frequency of 6 KHz with a bandwidth of 250 Hz.

4. The method of claim 3 wherein said second filter means is a bandpass filter having a center frequency of 11 KHz with a bandwidth of 250 Hz.

5. A method of differentiating a received wireless signal between a wireless analog signal and a wireless digitally encoded signal, wherein said wireless analog signal is characterized by having a Supervisory Audio Tone signal and a bandwidth limited data signal, said method comprising:
   converting said received wireless signal into a baseband signal;
   measuring the energy of a portion of said baseband signal to determine the amount of said SAT signal and generating a first energy signal in response;
   measuring the energy of another portion of said baseband signal to determine the amount of energy of said received wireless signal outside said bandwidth limited data signal and generating a second energy signal in response;
   subtracting said first energy signal by said second energy signal to determine a difference signal;
   comparing said difference signal to a threshold to differentiate said received wireless signal between a wireless analog signal and a wireless digitally encoded signal.

6. The method of claim 5 wherein said received wireless signal is an analog signal if i) said difference signal is greater than a first threshold; or ii) if said difference signal is greater than a second threshold and if the second energy signal is less than a third threshold.

7. The method of claim 5 further comprising the step of digitizing said baseband signal prior to the measuring steps.

8. A method of locating a Digital Control Channel of a wireless digitally encoded signal; said digitally encoded signal and a wireless analog signal are transmitted in a plurality of channels, said wireless analog signal being characterized by a Supervisory Audio Tone signal and a voice signal having a bandwidth, said method comprising:
   a) selecting one of said plurality of channels;
   b) receiving a wireless signal transmitted in said one channel selected;
   c) converting said received wireless signal into a baseband signal;
   d) measuring the energy of a portion of said baseband signal to determine the amount of said Supervisory Audio Tone signal of said received wireless signal and generating a first energy signal in response;
   e) measuring the energy of another portion of said baseband signal to determine the amount of energy outside said bandwidth and generating a second energy signal in response;
   f) subtracting said first energy signal by said second energy signal to determine a difference signal;
   g) comparing said difference signal to a threshold;
   h) selecting another channel in response to the comparison step and reverting to step b; in the event said wireless signal received is said wireless analog signal; and
   i) locating said Digital Control Channel based upon said wireless signal received.

9. The method of claim 8 further comprising the step of digitizing said baseband signal at 48.6 KHz to produce a digitized baseband signal prior to the measuring steps (d) and (e).

10. The method of claim 9 wherein said measuring step (d) further comprising:
    filtering said digitized baseband signal by a first filter means having a center frequency of 6 KHz with a bandwidth of 250 Hz to generate a first filtered signal in response thereto;

measuring the amplitude of said first filtered signal over a period of time to generate said first energy signal.

11. The method of claim 10 wherein said measuring step (e) further comprising:

filtering said digitized baseband signal by a second filter means having a center frequency of 11 KHz with a bandwidth of 250 Hz to generate a second filtered signal in response thereto;

measuring the amplitude of said second filtered signal over said period of time to generate said second energy signal.

12. The method of claim 11 wherein said selecting step selects another channel in the event:

i) said difference signal is greater than a first threshold; or ii) said difference signal is greater than a second threshold, less than said first threshold, and said second energy signal is less than a third threshold.

13. A telecommunication apparatus for communicating wirelessly with a base station, wherein said base station transmits a wireless digitally encoded signal in a first of a plurality of channels, a control signal for said wireless digitally encoded signal in a second of said plurality of channels, and a wireless analog signal in a third of said plurality of channels, said apparatus for differentiating between said wireless analog signal and said wireless digitally encoded signal, comprising:

antenna means for receiving a wireless signal transmitted by said base station in one of said plurality of channels and for generating a received RF signal in response thereto;

baseband converting means for converting said received RF signal into a baseband signal;

digitizing means for digitizing said baseband signal into a digitized signal;

first filter means for filtering said digitized signal to produce a first filtered signal;

second filter means for filtering said digitized signal to produce a second filtered signal;

first generating means for generating a first energy signal based upon said first filtered signal;

second generating means for generating a second energy signal based upon said second filtered signal;

subtracting means for subtracting said second energy signal from said first energy signal to produce a difference signal; and means for comparing said difference signal to a threshold and in response thereto for determining either said wireless analog signal or said wireless digitally encoded signal.

14. The apparatus of claim 13 wherein said comparing means determines said received wireless signal is a wireless analog signal if a) said difference signal is greater than a first threshold; or if b) said difference signal is greater than a second threshold and if the second energy signal is less than a third threshold.

15. The apparatus of claim 13 wherein said digitizing means digitizes said baseband signal at 48.6 KHz.

16. The apparatus of claim 13 wherein said first filter means has a center frequency of 6 KHz with a bandwidth of 250 Hz.

17. The apparatus of claim 13 wherein said second filter means has a center frequency of 11 KHz with a bandwidth of 250 Hz.

18. The apparatus of claim 13 wherein said first energy measuring means measures the amplitude of said first filtered signal over a period of time to generate said first energy signal.

19. The apparatus of claim 13 wherein said second energy measuring means measures the amplitude of said second filtered signal over a period of time to generate said second energy signal.

* * * * *